(12) United States Patent
Park et al.

(10) Patent No.: US 10,469,731 B2
(45) Date of Patent: Nov. 5, 2019

(54) IMAGE SENSOR AND IMAGING DEVICE INCLUDING THE SAME

(71) Applicant: Samsung Electronics Co., Ltd., Suwon-si, Gyeonggi-do (KR)

(72) Inventors: Jin-sub Park, Suwon-si (KR); Il-yun Jeong, Yongin-si (KR); Jae-hoon Seo, Hwaseong-si (KR); Jong-seok Seo, Seoul (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 8 days.

(21) Appl. No.: 15/661,747

(22) Filed: Jul. 27, 2017

(65) Prior Publication Data

US 2018/0084187 A1 Mar. 22, 2018

(30) Foreign Application Priority Data

Sep. 19, 2016 (KR) .................. 10-2016-0119559

(51) Int. Cl.
*H04N 5/232* (2006.01)
*H04N 5/235* (2006.01)
*H04N 9/04* (2006.01)
*H04N 5/355* (2011.01)

(52) U.S. Cl.
CPC ....... *H04N 5/23212* (2013.01); *H04N 5/2353* (2013.01); *H04N 5/35554* (2013.01); *H04N 9/045* (2013.01); *H04N 2209/042* (2013.01)

(58) Field of Classification Search
CPC .. H04N 5/23212; H04N 5/2353; H04N 9/045; H04N 2209/042
See application file for complete search history.

(56) References Cited

U.S. PATENT DOCUMENTS

| 8,735,795 | B2 | 5/2014 | Qiao et al. |
| 9,157,794 | B2 | 10/2015 | Namba et al. |
| 9,210,330 | B2 | 12/2015 | Seo |
| 2005/0088567 | A1 | 4/2005 | Kim |
| 2008/0049137 | A1* | 2/2008 | Endo .................. H04N 5/23212 |
| | | | 348/333.13 |

(Continued)

FOREIGN PATENT DOCUMENTS

| JP | 2010-220035 A | 9/2010 |
| JP | 2010-262242 A | 11/2010 |

(Continued)

*Primary Examiner* — Lin Ye
*Assistant Examiner* — John H Morehead, III
(74) *Attorney, Agent, or Firm* — Harness, Dickey & Pierce, P.L.C.

(57) ABSTRACT

Provided are an image sensor and an imaging device including the same. The image sensor is configured to generate illuminance data by receiving a light signal including image information of an object and ambient light information and includes a sensing module including a pixel array including a plurality of unit pixels, configured to sense the light signal irradiated to the pixel array and to generate pixel data corresponding to the sensed light signal, and an illuminance data generator configured to generate illuminance data corresponding to ambient light based on the pixel data, wherein the illuminance data generator is configured to generate the illuminance data based on pixel data when the light signal is not focused on the pixel array.

17 Claims, 15 Drawing Sheets

(56) References Cited

U.S. PATENT DOCUMENTS

2008/0240700 A1* 10/2008 Takagi .................. G03B 13/32
396/98
2014/0055635 A1   2/2014 Seo
2015/0373250 A1* 12/2015 Sfaradi .............. H04N 5/23212
348/345
2016/0307324 A1* 10/2016 Nakada ................ G06K 9/6215

FOREIGN PATENT DOCUMENTS

| KR | 2012-0000264 A | 1/2012 |
| KR | 2014-0024707 A | 3/2014 |
| KR | 2015-0053189 A | 5/2015 |
| KR | 10-1598533 B1 | 2/2016 |

* cited by examiner

IMAGE SENSOR AND IMAGING DEVICE INCLUDING THE SAME

CROSS-REFERENCE TO RELATED APPLICATION

This application claims the benefit of Korean Patent Application No. 10-2016-0119559, filed on Sep. 19, 2016, in the Korean Intellectual Property Office, the disclosure of which is incorporated herein in its entirety by reference.

BACKGROUND

The inventive concepts relate to an image sensor, and more particularly, to an image sensor capable of measuring illuminance of ambient light and an imaging device including the same.

A charge coupled device (CCD) image sensor and a complementary metal oxide semiconductor (CMOS) image sensor have been widely used to acquire images of an object. An image sensor may convert a light signal including image information of an object to an electrical signal. An image sensor may be included in various electronic devices, and recently, many electronic devices may have a function of measuring illuminance of ambient light of an environment around an object as well as a function of acquiring an image of the object.

SUMMARY

The inventive concepts provide an image sensor having both a function of acquiring an image of an object and a function of measuring illuminance of ambient light.

The inventive concepts provides an imaging device including the image sensor having both a function of acquiring an image of an object and a function of measuring illuminance of ambient light.

According to an example embodiment of the inventive concepts, there is provided an image sensor configured to generate illuminance data by receiving a light signal including image information of an object and ambient light information, the image sensor including a sensing module including a pixel array, the sensing module configured to sense the light signal irradiated to the pixel array, and configured to generate pixel data corresponding to the sensed light signal, and an illuminance data generator configured to generate illuminance data corresponding to ambient light based on the pixel data, wherein the illuminance data generator is configured to generate the illuminance data based on pixel data when the light signal is not focused on the pixel array.

According to another example embodiment of the inventive concepts, there is provided an imaging device including a lens configured to condense, or concentrate, a light signal including image information of an object and ambient light information, a focus adjusting module configured to adjust a focus of the light signal, and an image sensor including a sensing module, which includes a pixel array, the sensing module configured to sense the light signal irradiated to the pixel array and generate pixel data corresponding to the sensed light signal, and an illuminance data generator configured to generate illuminance data corresponding to ambient light based on the pixel data, wherein the illuminance data generator is configured to select valid sensing units from among the plurality of sensing units by performing a sub-sampling operation with respect to the pixel array and generate the illuminance data based on valid pixel data corresponding to the valid sensing units when the light signal is not focused on the pixel array.

According to another example embodiment of the inventive concepts, there is provided an electronic system including an application processor and an image sensor connected to the application processor. The image sensor includes a pixel array and an image sensor processor. The image sensor processor is configured to operate in a first mode to sense a light signal irradiated to the pixel array, to generate pixel data corresponding to the sensed light signal, and to generate illuminance data corresponding to ambient light based on the pixel data when the light signal is not focused on the pixel array.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Figure 1:
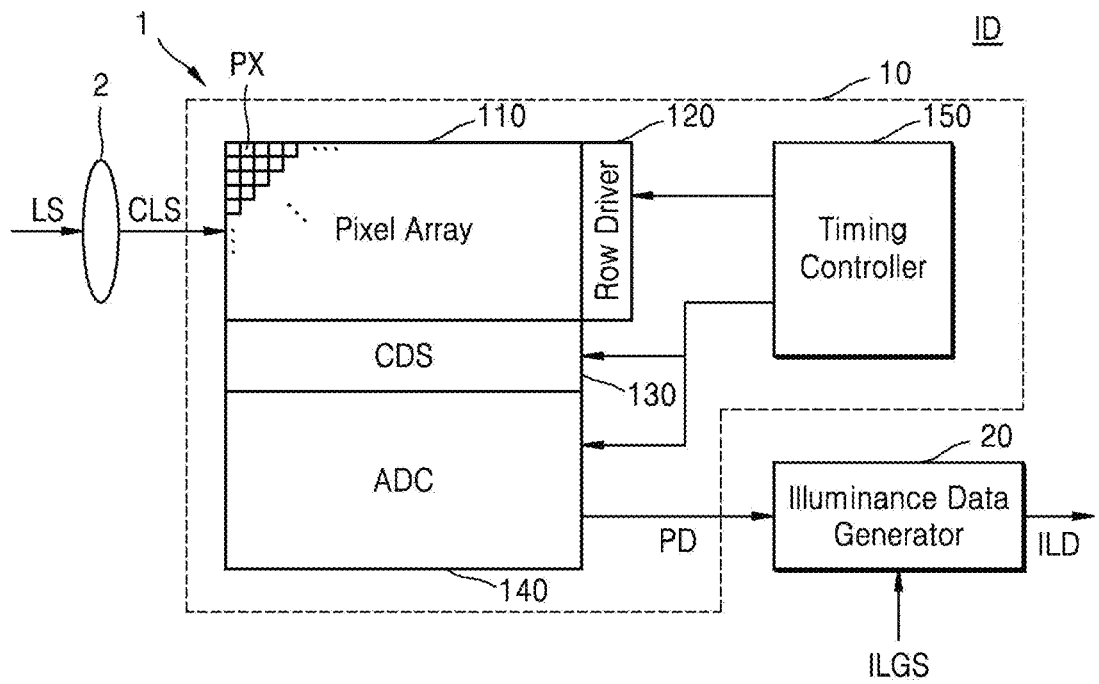
FIG. 1 is a block diagram of an imaging device according to an example embodiment of the inventive concepts.

FIG. 1 is a block diagram of an imaging device according to an example embodiment of the inventive concepts.

Referring to FIG. 1, an imaging device ID may include an image sensor 1 and a lens 2. The image sensor 1 may include a sensing module 10 and an illuminance data generator 20. The image sensor 1 may receive a light signal CLS condensed or concentrated from the lens 2 and may generate illuminance data ILD by processing the condensed or concentrated light signal CLS.

The lens 2 may receive and condense, or concentrate a light signal LS including ambient illuminance information and image information, and may output the condensed or concentrated light signal CLS to the image sensor 1. The lens 2 may adjust a focus of the light signal LS, and the condensed or concentrated light signal CLS may be a light signal focused or not focused on a pixel array 110 included in the image sensor 1.

The sensing module 10 may include a pixel array 110, a row driver 120, a correlated double sampling (CDS) unit 130, an analog-to-digital converting (ADC) unit 140, and a timing controller 150.

The pixel array 110 may include a plurality of unit pixels PXs. The plurality of unit pixels PXs may be arranged in a matrix form having a plurality of rows and a plurality of columns. The pixel array 110 may generate a plurality of analog pixel signals based on the condensed or concentrated light signal CLS including image information of an object and ambient light information.

The row driver 120 may be connected to at least one of the rows of the pixel array 110, and may generate a driving signal driving at least one of the rows. The row driver 120 may drive the plurality of unit pixels PXs included in the pixel array 110 row by row.

The CDS unit 130 may perform a CDS operation with respect to a plurality of analog pixel signals generated by the pixel array 110 and may generate a plurality of CDS signals. For example, the CDS unit 130 may perform a CDS operation by obtaining a difference between an analog reset signal indicating reset components of analog pixel signals and an analog data signal indicating image components of the analog pixel signals and ambient light components, and may output CDS signals corresponding to valid signal components. The CDS unit 130 may include a plurality of CDS circuits respectively connected to column lines of the pixel array 110, and may output the CDS signals corresponding to the valid signal components.

An analog-digital converter 140 may generate pixel data PD by performing analog-digital conversion corresponding to the CDS signals. Though not shown in FIG. 1, the analog-digital converter 140 may include a counter and a buffer. The counter may generate a counting signal by counting the analog reset signal and the analog data signal, and may provide the counting signal to the buffer. The buffer, which includes a plurality of latch circuits respectively connected to the column lines, may latch the counting signal per column and may output the latched counting signal to, for example, the illuminance data generator 20 as pixel data PD.

The timing controller 150 may control the row driver 120, the CDS unit 130, and the analog-digital converter 140. The timing controller 150 may supply control signals such as a clock signal or a timing control signal required to operate the row driver 120, the CDS unit 130, and the analog-digital converter 140. According to an example embodiment, the timing controller 150 may include a logic control circuit, a phase lock loop (PLL) circuit, a timing control circuit, and a communication interface circuit.

Though not shown in FIG. 1, the sensing module 10 may further include a voltage generator generating various driving voltages such as a reference voltage or a lamp voltage. Furthermore, FIG. 1 illustrates that the sensing module 10 performs analog double sampling. However, according to an example embodiment, the sensing module 10, after respectively converting an analog reset signal and an analog data signal to digital signals, may perform digital double sampling extracting a difference between the two digital signals with the valid signal component, or may perform dual CDS both performing the analog double sampling and the digital double sampling.

The illuminance data generator 20 may generate illuminance data ILD corresponding to ambient light based on the pixel data PD received from the sensing module 10. In one example embodiment, the illuminance data generator 20 may generate illuminance data ILD corresponding to an illuminance data generation signal ILGS received from the outside or the inside of the image sensor 1. The illuminance data generation signal ILGS may be output to the illuminance data generator 20 when the condensed or concentrated light signal CLS is not focused on the pixel array 110. Therefore, the illuminance data generator 20 may generate the illuminance data ILD by using the pixel data PD corresponding to the light signal CLS that is not focused on the pixel array 110.

The illuminance data generator 20 may perform a cropping operation and/or a sub-sampling operation while generating the illuminance data ILD. Furthermore, the illuminance data generator 20 may generate valid pixel data with respect to a valid sensing unit that is sampled through the sub-sampling operation by using different methods, and thereby may generate the illuminance data ILD. This will be described later below in detail with reference to FIGS. 7 through 11.

Figure 2:
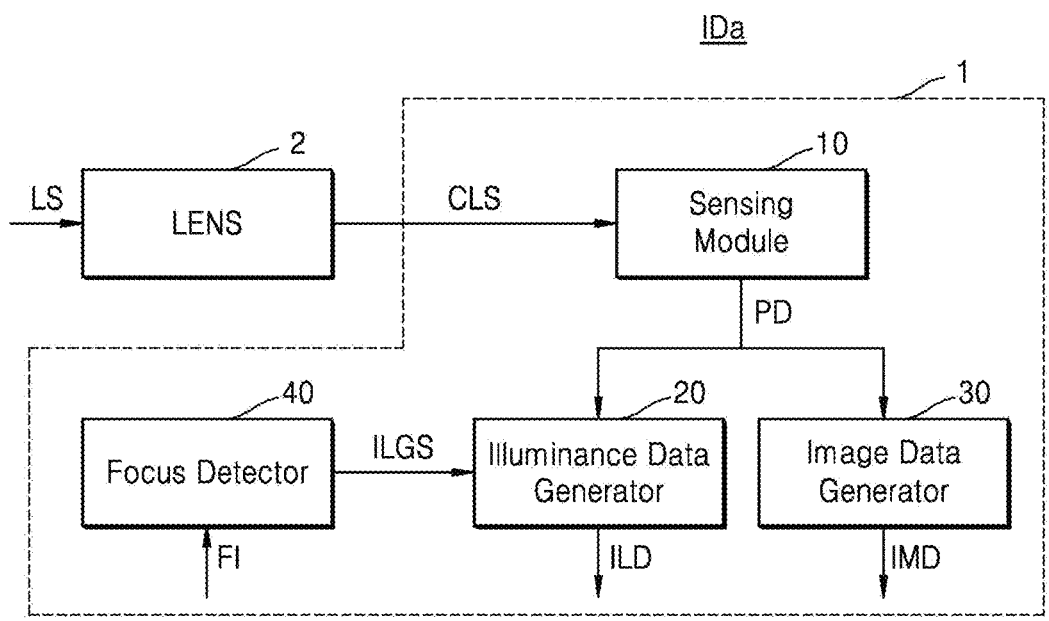
FIG. 2 is a block diagram of an imaging device according to an example embodiment of the inventive concepts.

FIG. 2 is a block diagram of an imaging device according to an example embodiment of the inventive concepts.

Referring to FIGS. 1 and 2, the imaging device IDa may include the image sensor 1 and the lens 2, wherein the image sensor 1 may include the sensing module 10, the illuminance data generator 20, an image data generator 30, and a focus detector 40. Since descriptions of the lens 2, the sensing module 10, and the illuminance data generator 20 are already described in FIG. 1, repeated descriptions thereof will not be given herein.

The image data generator 30 may generate image data IMD by receiving the pixel data PD from the sensing module 10. According to an example embodiment, the image data generator 30 may generate the image data IMD by performing image interpolation with respect to the pixel data PD, color correction, white balance, gamma correction, and/or color conversion. The image data IMD of the image data generator 30 and the illuminance data ILD of an illuminance data generator 160 may be simultaneously, contemporaneously, or separately generated. For example, the image data generator 30 may generate the image data IMD by processing the pixel data PD with respect to a light signal focused on the pixel array 110, and the illuminance data generator 20 may generate the illuminance data ILD by processing the pixel data PD with respect to a light signal that is not focused on the pixel array 110. Accordingly, the illuminance data ILD may be generated first in a state when the condensed or concentrated light signal CLS is not focused on the pixel array 110, and next, the image data IMD may be generated when the condensed or concentrated light signal CLS is focused on the pixel array 110 by the lens 2.

The focus detector 40 may receive focus information FI from the inside or the outside of the image sensor 1, and may output the illuminance data generation signal ILGS to the illuminance data generator 20. The focus information FI may include information about whether the condensed or concentrated light signal CLS is focused on the pixel array 110. In one example embodiment, the focus detector 40, by receiving the focus information FI, may determine whether the condensed or concentrated light signal CLS is focused on the pixel array 110, and when the condensed or concentrated light signal CLS is not focused on the pixel array 110, may output the illuminance data generation signal ILGS to the illuminance data generator 20. In one example embodiment, when the condensed or concentrated light signal CLS is focused on the pixel array 110, the focus detector 40 may output an image data generation signal to the image data generator 30 (not shown).

Figure 3:
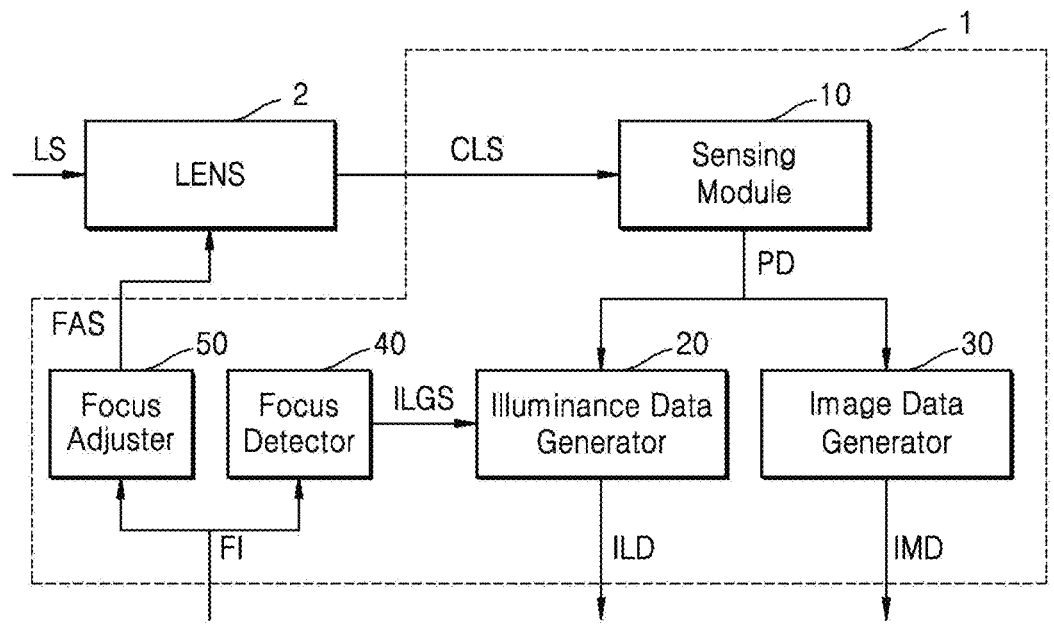
FIG. 3 is a block diagram of an imaging device according to an example embodiment of the inventive concepts.

FIG. 3 is a block diagram of an imaging device according to an example embodiment of the inventive concepts.

Referring to FIGS. 1 and 3, the imaging device IDb may include the image sensor 1 and the lens 2, wherein the image sensor 1 may include the sensing module 10, the illuminance data generator 20, the image data generator 30, the focus detector 40, and a focus detector 50. Since descriptions of the lens 2, the sensing module 10, the illuminance data generator 20, the image data generator 30, and the focus detector 40 are already described in FIG. 1 or 2, repeated descriptions thereof will not be given herein.

The focus adjuster 50 may receive the focus information FI and thereby may output the focus adjustment signal FAS to the lens 2. The lens 2 may adjust a focus of the condensed or concentrated light signal CLS corresponding to the focus adjustment signal FAS. The focus adjustment signal FAS may include a defocusing signal adjusting the condensed or concentrated light signal CLS so as not to be focused on the pixel array 110 and a focusing signal adjusting the condensed or concentrated light signal CLS to be focused on the pixel array 110.

According to an example embodiment, the focus adjuster 50, when receiving the focus information FI about that the condensed or concentrated light signal CLS is focused on the pixel array 110 before the illuminance data ILD is generated, may output a defocusing signal adjusting the condensed or concentrated light signal CLS so as not to be focused on the pixel array 110 to the lens 2 as the focus adjustment The lens 2 may adjust the condensed or concentrated light signal CLS to be focused on the pixel array 110, and the illuminance data generator 20 may generate the illuminance data ILD by using the pixel data PD at that time.

In one example embodiment, the focus adjuster 50 may output a sequential focus adjustment signal FAS. When the lens 2 captures an object, the focus adjuster 50 may output a defocusing signal as the focus adjustment signal FAS. The lens 2 may adjust the condensed or concentrated light signal CLS so as not to be focused on the pixel array 110, and the illuminance data generator 20 may generate the illuminance data ILD by using the pixel data PD at that time. Next, the focus adjuster 50 may output a focusing signal as the focus adjustment signal FAS. The lens 2 may adjust the condensed or concentrated light signal CLS to be focused on the pixel array 110, and the image data generator 30 may generate the image data IMD by using the pixel data PD at that time.

FIG. 3 illustrates that the focus adjuster 50 adjusts a focus by outputting the focus adjustment signal FAS to the lens 2. However, it should be understood that the focus adjuster 50 substantially controls a device such as a motor capable of adjusting a focus of the condensed or concentrated light signal CLS by adjusting a distance between the lens 2 and the pixel array 110.

Figure 4:
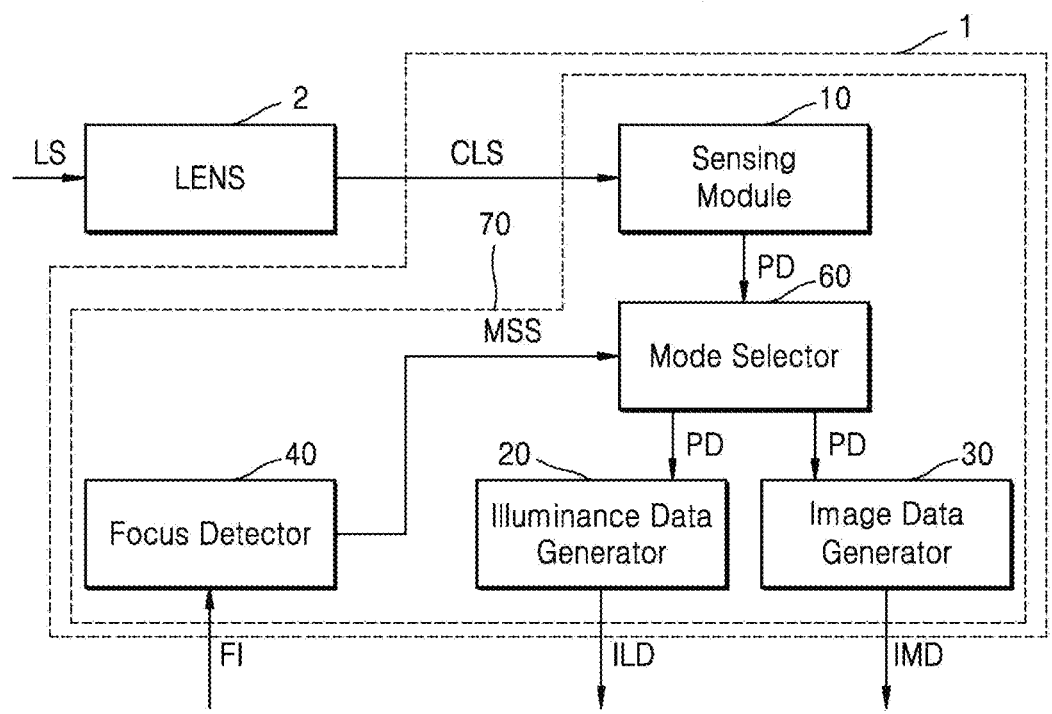
FIG. 4 is a block diagram of an imaging device according to an example embodiment of the inventive concepts.

FIG. 4 is a block diagram of an imaging device according to an example embodiment of the inventive concepts.

Referring to FIGS. 1, 2, and 4, the imaging device ID may include the image sensor 1 and the lens 2, wherein the image sensor 1 may include the sensing module 10, the illuminance data generator 20, the image data generator 30, the focus detector 40, and a mode selector 60. Since descriptions of the lens 2, the sensing module 10, the illuminance data generator 20, the image data generator 30, and the focus detector 40 are already described in FIG. 1 or 2, repeated descriptions thereof will not be given herein.

The mode selector 60 may receive a mode selection signal MSS from the focus detector 40, and may transmit the pixel data PD received from the sensing module 10 to the illuminance data generator 20 or the image data generator 30. In one example embodiment, the focus detector 40, when the condensed or concentrated light signal CLS is not focused on the pixel array 110, may output an illuminance data generation mode selection signal as the mode selection signal MSS. The mode selector 60 may transmit the pixel data PD to the illuminance data generator 20. The focus detector 40, when the condensed or concentrated light signal CLS is focused on the pixel array 110, may output an image data generation mode selection signal as the mode selection signal MSS. The mode selector 60 may transmit the pixel data PD to the image data generator 30. Accordingly, the pixel data PD may be selectively transmitted to any one of the illuminance data generator 20 and the image data generator 30.

The inventive concepts are not limited thereto. For example, the image sensor 1 may include an image sensor processor 70 configured to perform the sensing operations of the sensing module 10, the illuminance data generation operations of the illuminance data generator 20, the image data generation operations of the image data generator 30, the focus detecting operations of the focus detector 40, the focus adjusting operations of the focus adjustor 50, and the mode selection operations of the mode selector 60.

It should be understood that each of the various embodiments of the sensing module 10, the illuminance data generator 20, the image data generator 30, the focus detector 40, the focus adjuster 50, and the mode selector 60 can be implemented as software executing on a programmed general purpose computer, a special purpose computer, a microprocessor or the like. It should also be understood that each of the circuits, routines, applications, objects or managers shown in FIGS. 1-4 can be implemented as portions of a suitably programmed general-purpose computer. Alternatively, each of the circuits, routines, applications, objects or managers shown in FIGS. 1-4 can be implemented as physically distinct hardware circuits within an ASIC, using a digital signal processor (DSP), using a FPGA, a PLD, a PLA and/or a PAL, or using discrete logic elements or discrete circuit elements. The particular form of the circuits, routines, applications, objects or managers shown in FIG. 1-4 will take is a design choice and will be obvious and predictable to those skilled in the art. It should be appreciated that the circuits, routines, applications, objects or managers shown in FIGS. 1-4 do not need to be of the same design.

Figure 5:
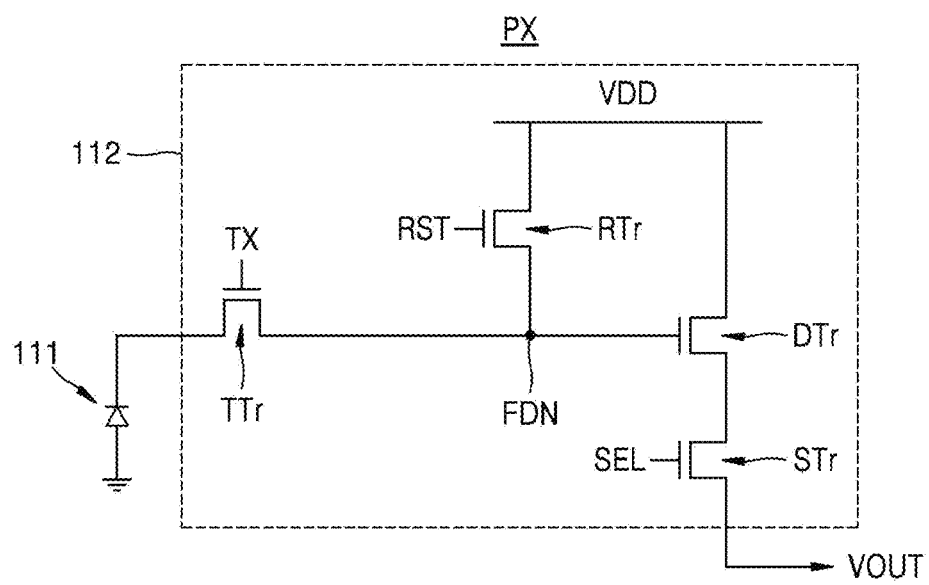
FIG. 5 is a circuit diagram showing an example of a unit pixel according to an example embodiment of the inventive concepts.

FIG. 5 is a circuit diagram showing an example of a unit pixel according to an example embodiment of the inventive concepts.

Referring to FIG. 5, a unit pixel PX may include a photoelectric converter 111 and a signal generator 112.

The photoelectric converter 111 may perform photoelectric conversion. For example, the photoelectric converter 111 may convert incident light to light charges in a light integration mode. When the unit pixel PX is a unit pixel of a CMOS image sensor, a shutter of the CMOS image sensor is open in the light integration mode and a charge carrier such as an electronic-hole pair may be generated in the photoelectric converter 111 by the incident light. Thus, information about an image of an object and ambient light information may be collected.

The signal generator 112 may generate a pixel output signal VOUT based on the light charges generated by the photoelectric conversion in a readout mode. When the unit pixel PX is a unit pixel of a CMOS image sensor, the shutter of the CMOS image sensor is closed in the readout mode after the light integration mode, and the pixel output signal VOUT based on the information about an image of an object collected in a charge carrier type and the ambient light information may be generated. Analog pixel signals may be a combination of the pixel output signal VOUT provided by a single unit pixel.

Figure 6A:
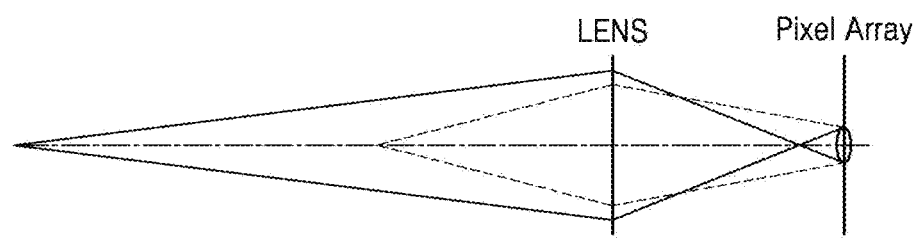
FIGS. 6A and 6B are views illustrating a defocusing operation according to an example embodiment of the inventive concepts.
Figure 6B:
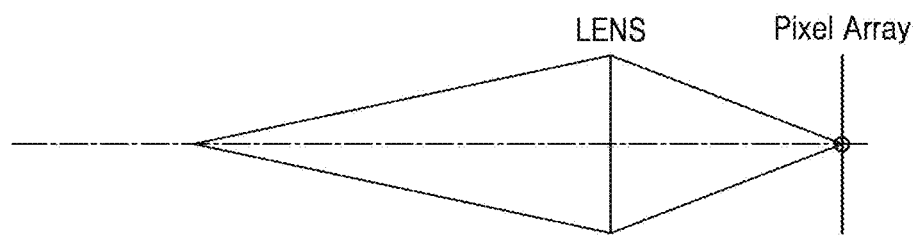

The unit pixel PX may be divided into a 1-transistor structure, a 3-transistor structure, a 4-transistor structure, and a 5-transistor structure depending on the number of transistors included in the signal generator 112, and may have a structure of a plurality of pixels sharing some of the transistors. FIGS. 6A and 6B show a 4-transistor structure as an example. For example, the signal generator 112 may include a transmission transistor TTr, a reset transistor RTr, a drive transistor DTr, and a selection transistor STr, and may further include a floating diffusion node FDN. The transmission transistor TTr may include a first terminal connected to the photoelectric converter 111, a second terminal connected to the floating diffusion node FDN, and a gate to which a transmission signal TX is applied. The reset transistor RTr may include a first terminal to which a power voltage VDD is applied, a second terminal connected to the floating diffusion node FDN, and a gate to which a reset signal RST is applied. The drive transistor DTr may include a first terminal to which the power voltage VDD is applied, a gate and second terminal connected to the floating diffusion node FDN. The selection transistor STr may include a first terminal connected to the second terminal of the drive transistor DTr, a gate to which a selection signal SEL is applied, and a second terminal outputting the pixel output signal VOUT.

FIGS. 6A and 6B are views illustrating a defocusing operation according to an example embodiment of the inventive concepts.

Referring to FIG. 1, and FIGS. 6A and 6B, FIG. 6A shows a condensed or concentrated light signal CLS that is defocused (for example, not focused) on the pixel array 110. FIG. 6B shows the condensed or concentrated light signal CLS that is focused on the pixel array 110. When the condensed or concentrated light signal CLS is focused on the pixel array 110, a range of an image in the pixel array 110 is less than a range of an image that is not focused on the pixel array 110.

When the pixel array 110 is irradiated with the condensed or concentrated light signal CLS, a plurality of unit pixels PXs may receive the condensed or concentrated light signal CLS. Since the condensed or concentrated light signal CLS has illuminance information of a corresponding point, a plurality of unit pixels PXs received a single light signal LS may receive the illuminance information of the corresponding point.

When FIG. 6A is compared with FIG. 6B, due to a difference between the ranges of the images in the pixel array 110, the number of the plurality of unit pixels PXs receiving the illuminance information in FIG. 6B may be less than the number of the plurality of unit pixels PXs receiving the illuminance information in FIG. 6A. However, since the pixel array 110 receives a plurality of condensed or concentrated light signals CLS when the imaging device ID takes a picture of an object, the number of the plurality of condensed or concentrated light signals CLS transmitted to a single unit pixel PX in FIG. 6A may be greater than the number of the plurality of condensed or concentrated light signals CLS transmitted to a single unit pixel PX in FIG. 6B. Therefore, the single unit pixel PX of FIG. 6A may receive much more pieces of illuminance information of corresponding points than pieces of illuminance information transmitted to the single unit pixel PX of FIG. 6B. Therefore, as described later below, the single unit pixel PX of FIG. 6A may have a sufficient amount of illuminance information of ambient light even if the number of valid sensing units sampled by the illuminance data generator 20 is small.

Furthermore, the number of the condensed or concentrated light signals CLS transmitted to the single unit pixel PX in FIG. 6B may be greater than that of the condensed or concentrated light signals CLS transmitted to the single unit pixel PX in FIG. 6A. The number of the condensed or concentrated light signals CLS transmitted to the single unit pixel PX is limited due to a limit on a photo diode. Therefore, some of the illuminance information may be lost when too many condensed or concentrated light signals CLS are transmitted to the single unit pixel PX. Therefore, a defocused single unit pixel PX of FIG. 6A may have a possibility of losing illuminance information less than in FIG. 6B while a focused single unit pixel PX of FIG. 6A has a possibility of losing illuminance information greater than in FIG. 6B.

Figure 7:
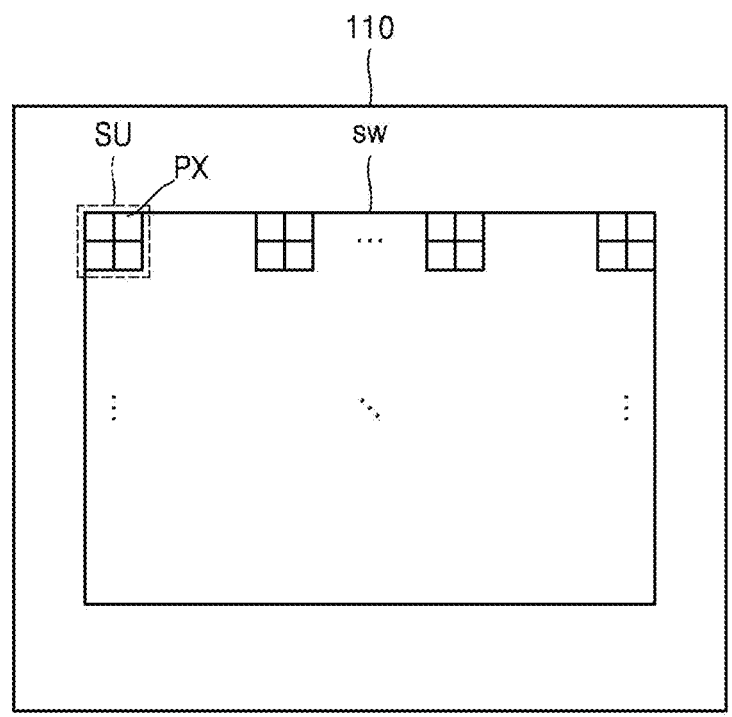
FIG. 7 is a block diagram of a pixel array according to an example embodiment of the inventive concepts.

FIG. 7 is a block diagram of a pixel array according to an example embodiment of the inventive concepts.

Referring to FIGS. 1 and 7, the pixel array 110 may include a plurality of sensing units SU. At least one of the plurality of sensing units SU may include at least two unit pixels adjacent to each other from among a plurality of unit pixels PXs. For example, at least some of the plurality of sensing units SU may include four unit pixels arranged in a 2×2 form.

Furthermore, the illuminance data generator 20 may perform a cropping operation and/or a sub-sampling operation with respect to the pixel array 110 to generate the illuminance data ILD generation and may select valid sensing units from among the plurality of sensing units SU. FIG. 7 may show cropping and sub-sampling operations.

Referring to FIG. 7, the illuminance data generator 20 may set a sensing window SW by performing the cropping operation. For example, a size of the pixel array 110 may be 1412×1412 pixels and a size of the sensing window SW may be 1280×1024 pixels. Furthermore, the illuminance data generator 20 may perform the sub-sampling operation with respect to the sensing window SW and may select valid sensing units from among the plurality of sensing units SU.

For example, a sub-sampling operation of 1/16 may be performed with respect to the sensing window SW of 1280×1024 pixels, and thus, valid sensing units of 80×64 pixels may be selected. The illuminance data generator 20 may extract valid pixel data corresponding to the valid sensing units from the pixel data PD. The pixel data PD may include a plurality of pixel values corresponding to the plurality of unit pixels PXs, and therefore, the valid pixel data may include pixel values corresponding to unit pixels included in the valid sensing units. However, the inventive concepts are not limited thereto. In some example embodiments, the illuminance data generator 20 may select valid sensing units only by the sub-sampling operation without the cropping operation.

In one example embodiment, the illuminance data generator 20 may not use valid pixel data received from some valid sensing units according to a reference when generating illuminance data ILD. For example, the illuminance data generator 20 may not use valid pixel data received from a valid sensing unit receiving a light signal LS including illuminance information equal to or greater than reference illuminance when generating illuminance data ILD. Accordingly, the illuminance data generator 20 may select valid pixel data according to a certain reference when generating illuminance data ILD and may generate accurate illuminance data ILD.

Figure 8A:
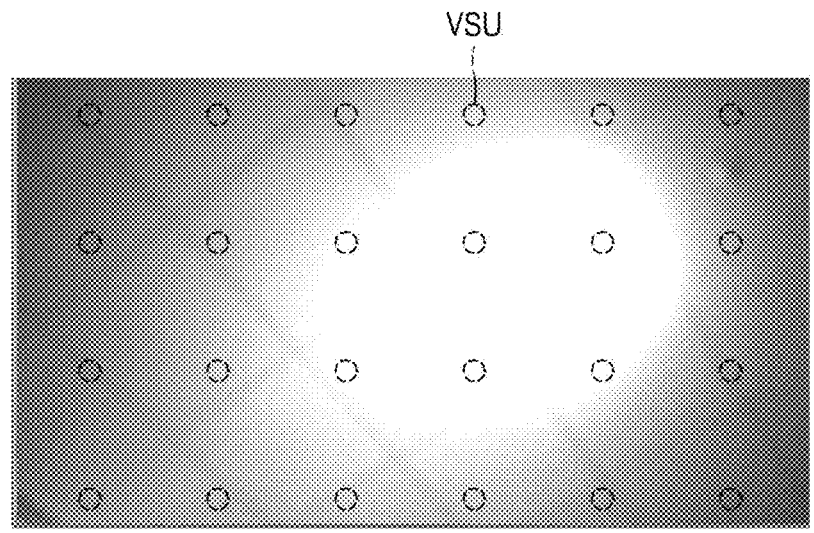
FIGS. 8A and 8B are views illustrating a sub-sampling operation after a defocusing operation according to an example embodiment of the inventive concepts.
Figure 8B:
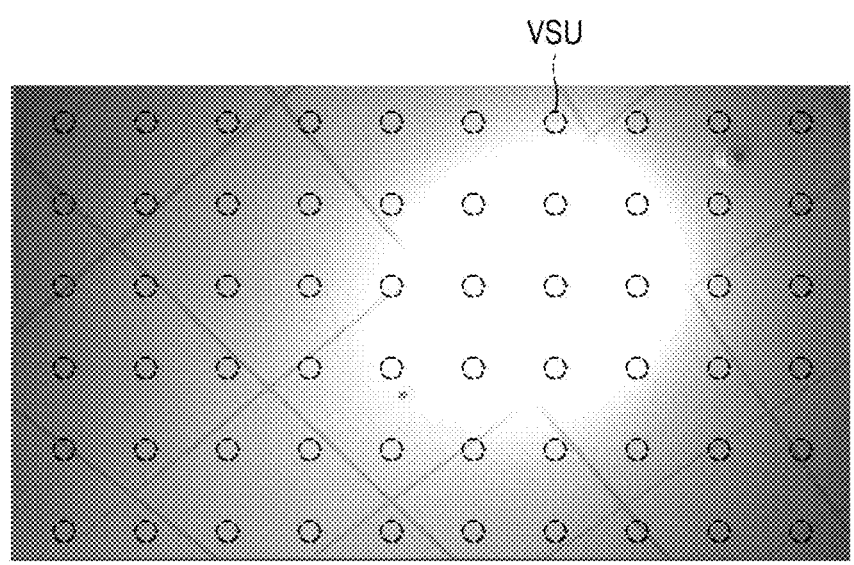

FIGS. 8A and 8B are views illustrating a sub-sampling operation after a defocusing operation according to an example embodiment of the inventive concepts.

Referring to FIG. 1 and FIGS. 6 to 8A and 8B, FIG. 8A shows defocused image data like FIG. 6A and FIG. 8B shows focused image data like FIG. 6B. Furthermore, a dashed circle indicates a valid sensing unit VSU selected by the illuminance data generator 20 using a sub-sampling operation. FIGS. 8A and 8B illustrates the number and shapes of valid sensing units VSUs, but it is only for convenience of explanation and the inventive concepts are not limited thereto.

When image data is defocused as shown in FIG. 8A, a blurred image may be formed and a plurality of light signals LSs may be transmitted to the unit pixel PX, in which the number of the light signals LSs is greater than in FIG. 8B showing focused image data. In the defocused image data of FIG. 8A, unclear image data IMD may be generated. However, sufficient illuminance information may be obtained by a relatively small number of sampling operations when the illuminance data ILD is generated because illuminance information of the plurality of light signals LSs can be used.

When image data is focused as shown in FIG. 8B, a clear image may be formed and image data may be generated, in which the image data is more clear than in FIG. 8A. However, since the number of the plurality of light signals LSs transmitted to each unit pixel PX is less than in FIG. 8A, a larger number of valid sensing units VSU may be desired to generate illuminance data ILD. Furthermore, a sensing unit SU exposed to light not less than illuminance may lose some of illuminance information included in a light signal LS because each unit pixel PX is overexposed. In this regard, FIG. 8B, in which case much more pieces of information than in FIG. 8A are received, may have a larger number of single pixels PXs overexposed to light not less than a reference illuminance than in FIG. 8A.

Therefore, according to an example embodiment of the inventive concepts, when the illuminance data generator 20 generates the illuminance data ILD after defocusing the condensed or concentrated light signal CLS, the desired number of valid sensing units VSUs via a sub-sampling operation may be less and the number of single pixels PXs overexposed to light not less than the reference illuminance may be reduced. Therefore, a power consumption of the image sensor 1 may be reduced and thus accurate illuminance data ILD may be generated.

Figure 9:
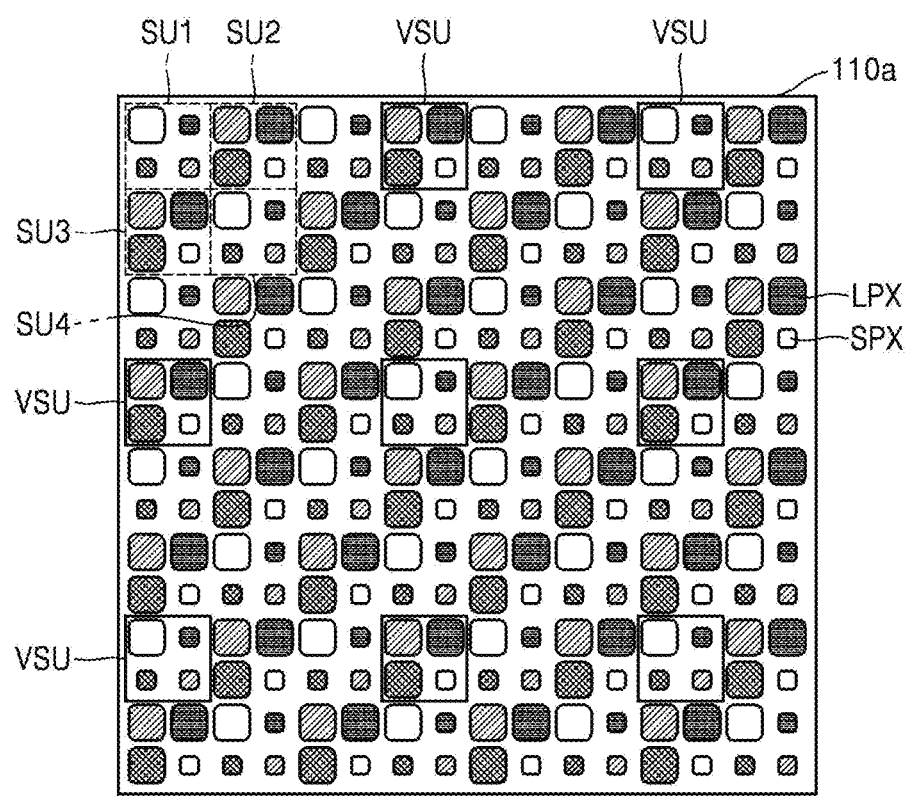
FIG. 9 is a view of a pixel array according to an example embodiment of the inventive concepts.

FIG. 9 is a view of a pixel array according to an example embodiment of the inventive concepts.

Referring to FIGS. 1 and 9, as described above, a pixel array 110a may include a plurality of unit pixels PXs arranged along a plurality of rows and columns, wherein, for example, a sensing unit SU defined by pixels arranged in two rows and two columns may include four pixels. Furthermore, the pixel array 110a may include a plurality of long-time exposure pixels LPXs and a plurality of short-time exposure pixels SPXs. An exposure time of a long-time exposure pixel LPX may be longer than that of a short-time exposure pixel SPX. Furthermore, the pixel array 110a may include a plurality of white pixels and a plurality of other color pixels (for example, first to third color pixels). The first to third color pixels may be red, green, and blue color pixels, respectively. However, this is only an example embodiment and other color pixels (for example, cyan (Cy), magenta (Mg), and yellow (Ye) colors) may also be applied to the first to third color pixels.

In the pixel array 110a, pixels of the same type may be repeatedly arranged at an interval. For example, as illustrated in FIG. 9, pixels of the same type may be repeatedly arranged based on a sensing unit group including 4*4 pixels (for example, 16 pixels). The sensing unit group may include first to fourth sensing units SU1 to SU4.

The first sensing unit SU1 may include one white pixel and three color pixels (hereinafter, represented by first to third pixels). Furthermore, some of the pixels may be long-time exposure pixels LPXs, and the other pixels may be short-time exposure pixels SPXs. In the first sensing unit SU1, the white pixel may correspond to a long-time exposure pixel LPX and the first to third color pixels may correspond to short-time exposure pixels SPXs.

The second and third sensing units SU2 and SU3 may be horizontally or vertically arranged adjacent to the first sensing unit SU1. Each of the second and third sensing units SU2 and SU3 may include a white pixel. In an example embodiment, at least one of the second and third sensing units SU2 and SU3 may include a white pixel corresponding to a short-time exposure pixel SPX. Also, the second sensing unit SU2 may include first to third color pixels corresponding to long-time exposure pixels LPXs, and the third sensing unit SU3 may also include the first to third color pixels corresponding to the long-time exposure pixels LPXs.

A fourth sensing unit SU4 may also include a white pixel, wherein the white pixel in the fourth sensing unit SU4 may correspond to a long-time exposure pixel LPX. Furthermore, the fourth sensing unit SU4 may include the first to third color pixels, wherein the first to third color pixels may correspond to short-time exposure pixels SPXs.

An exposure time of long-time exposure pixels LPXs may be different from an exposure time of short-time exposure pixels SPXs. For example, after long-time exposure pixels LPXs are selectively exposed to light during a relatively long time, the other short-time exposure pixels may be sequentially controlled to be selectively exposed to light during a relatively short time. Alternatively, by separate exposure control per pixel, some pixels (long-time exposure pixels LPXs) may be exposed to light during a relatively long time while the other pixels (short-time exposure pixels SPXs) are exposed to light during a relatively short time.

Pixel data PD having different exposure times in a single image frame may be obtained by the control.

Furthermore, white pixels corresponding to long-time exposure pixels LPXs and white pixels corresponding to short-time exposure pixels SPXs may be alternately arranged. For example, when a single white pixel is arranged per sensing unit, white pixels corresponding to long-time exposure pixels LPXs and white pixels corresponding to short-time exposure pixels SPXs may be alternately arranged in a lateral direction of a pixel array. According to a method similar to the above, white pixels corresponding to long-time exposure pixels LPXs and white pixels corresponding to short-time exposure pixels SPXs may be alternately arranged in a longitudinal direction of a pixel array. The method of alternately arranging long-time exposure pixels LPX and short-time exposure pixels SPX may be applied to other color pixels as well. For example, as illustrated in FIG. 9, in a case of the first to third color pixels, when color pixels corresponding to short-time exposure pixels SPXs are arranged in any one sensing unit (for example, the first sensing unit SU1), color pixels corresponding to long-time exposure pixels LPXs may be arranged in sensing units (for example, the second and third sensing units SU2 and SU3) adjacent to the first sensing unit SU1.

In one example embodiment, as described in solid lines in FIG. 9, the illuminance data generator 20 may select a sensing unit SU from one of sensing unit groups as a valid sensing unit VSU. Furthermore, the illuminance data generator 20 may not select a valid sensing unit VSU from any of the sensing unit group, and types of valid sensing units VSUs (first to fourth sensing units SU1 to SU4) selected from the sensing unit groups may be different from adjacent valid sensing units VSUs. For example, when the first sensing unit SU1 is selected as a valid sensing unit VSU in a specific sensing unit group, the second sensing unit SU2 or the third sensing unit SU3 may be selected as a valid sensing unit VSU in an adjacent valid sensing group.

Furthermore, in one example embodiment, the illuminance data generator 20 may generate illuminance data ILD per each valid sensing unit VSU based on different unit pixels PXs. For example, the illuminance data generator 20 may generate illuminance data ILD based on a short-time exposure pixel SPX in a case of a light sensing unit exposed to bright light, and may generate illuminance data ILD based on a long-time exposure pixel LPX in a case of a shade sensing unit exposed to dim light. A detailed description will be provided at a later time with respect to FIG. 11.

Although the long-time exposure pixel LPX is illustrated larger than the short-time exposure pixel SPX throughout the specification, this is merely a difference in expression and the inventive concepts are not limited thereto.

Figure 10A:
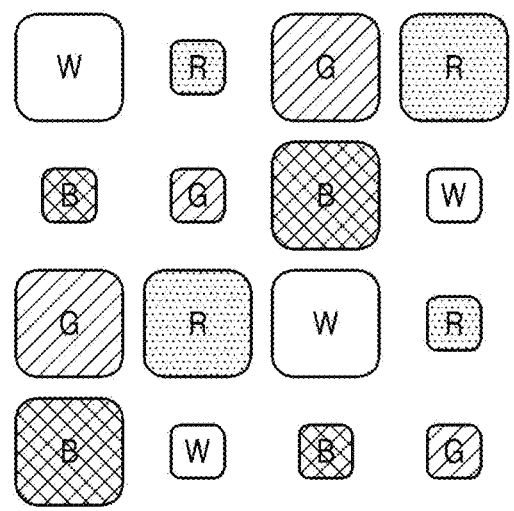
FIGS. 10A and 10B illustrate examples of the pixel array of FIG. 9 according to an example embodiment of the inventive concepts.
Figure 10B:
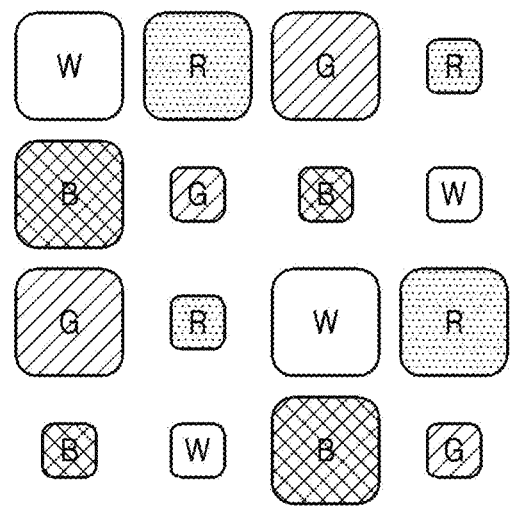

FIGS. 10A and 10B illustrate examples of the pixel array of FIG. 9 according to an example embodiment of the inventive concepts.

Referring to FIGS. 10A and 10B, the pixel array may include a plurality of white pixels and a plurality of red (R), green (G), and blue (B) pixels. In FIG. 10A, a unit pixel group includes a white pixel and R, G, and B pixels, wherein the white pixel may correspond to a long-time exposure pixel and the R, G, and B pixels may correspond to short-time exposure pixels. On the other hand, when the white pixel corresponds to a short-time exposure pixel, the R, G, and B pixels may correspond to long-time exposure pixels.

In FIG. 10B, when a white pixel arranged in a pixel group corresponds to a long-time exposure pixel, some of the R, G, and B pixels may correspond to long-time exposure pixels and the other may correspond to short-time exposure pixels. Alternatively, when the white pixel corresponds to a short-time exposure pixel, some of the R, G, and B pixels may correspond to short-time exposure pixels and the other may correspond to long-time exposure pixels. For example, types of a white pixel and a green pixel in a sensing unit may be different from each other, and thus, when the white pixel corresponds to a long-time exposure pixel in a unit pixel group, the green pixel may correspond to a short-time exposure pixel. However, the arrangement of pixels in the pixel array of FIGS. 10A and 10B is not limited thereto and may vary according to example embodiments of the inventive concepts.

Figure 11:
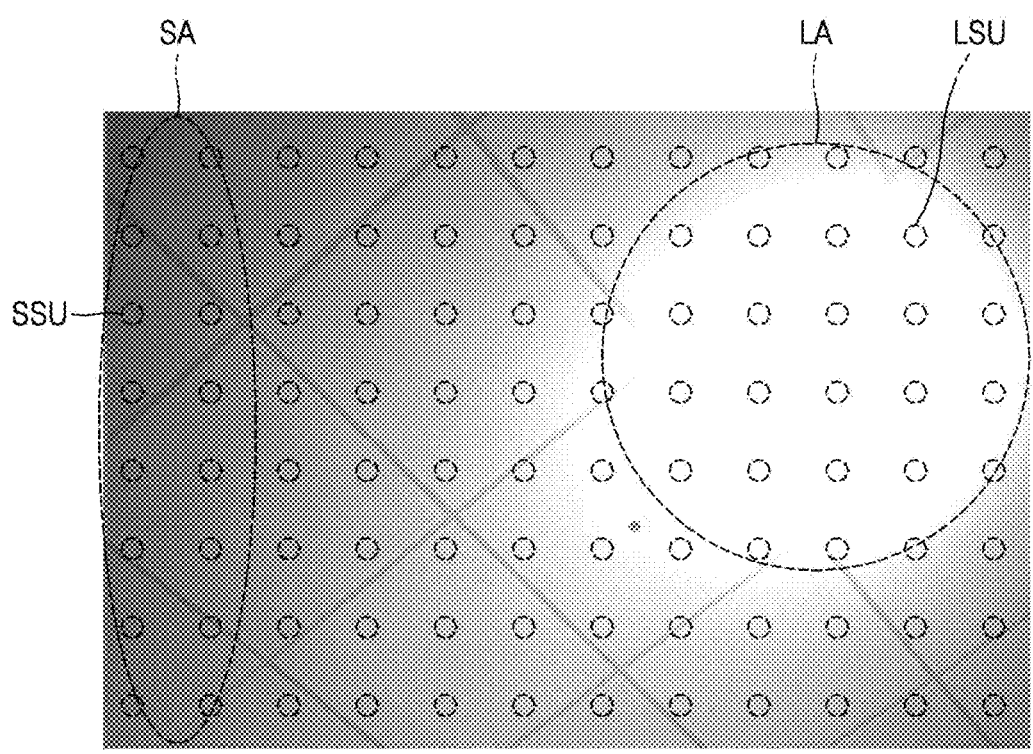
FIG. 11 illustrates an example of a case wherein an imaging device according to an example embodiment of the inventive concepts takes a picture of an object under light and shade illumination conditions.

FIG. 11 illustrates an example of a case wherein an imaging device according to an example embodiment of the inventive concepts takes a picture of an object under light and shade illumination conditions.

Referring to FIGS. 1, 9, and 11, the illuminance data generator 20 may divide an image of an object into a light area LA, a shade area SA, and the other areas according to reference illuminance. For example, the light area LA may be an area receiving a light signal LS including illuminance information with illuminance greater than first reference illuminance, the shade area SA may be an area receiving a light signal LS including illuminance information having illuminance less than second reference illuminance, and the other areas may be remaining areas. A light sensing unit LSU may be a sensing unit SU included in the light area LA, and the shade sensing unit SSU may be a sensing unit SU included in the shade area SA.

Furthermore, each sensing unit SU, as described above in FIG. 9, may include at least one long-time exposure pixel LPX and at least one short-time exposure pixel SPX. In one example embodiment, the illuminance data generator 20, with respect to the light area LA, may generate illuminance data ILD based on pixel data PD of a short-time exposure pixel SPX from among pieces of pixel data PD of unit pixels PXs included in the light sensing unit LSU. Furthermore, the illuminance data generator 20, with respect to the shade area SA, may generate illuminance data ILD based on pixel data PD of a long-time exposure pixel LPX from among pieces of pixel data PD of unit pixels PXs included in the shade sensing unit SSU. By selecting pixel data PD of different unit pixels PXs per area, the illuminance data generator 20 may compensate illuminance information of a unit pixel PX overexposed to a light signal LS and may generate accurate illuminance data ILD.

Figure 12:
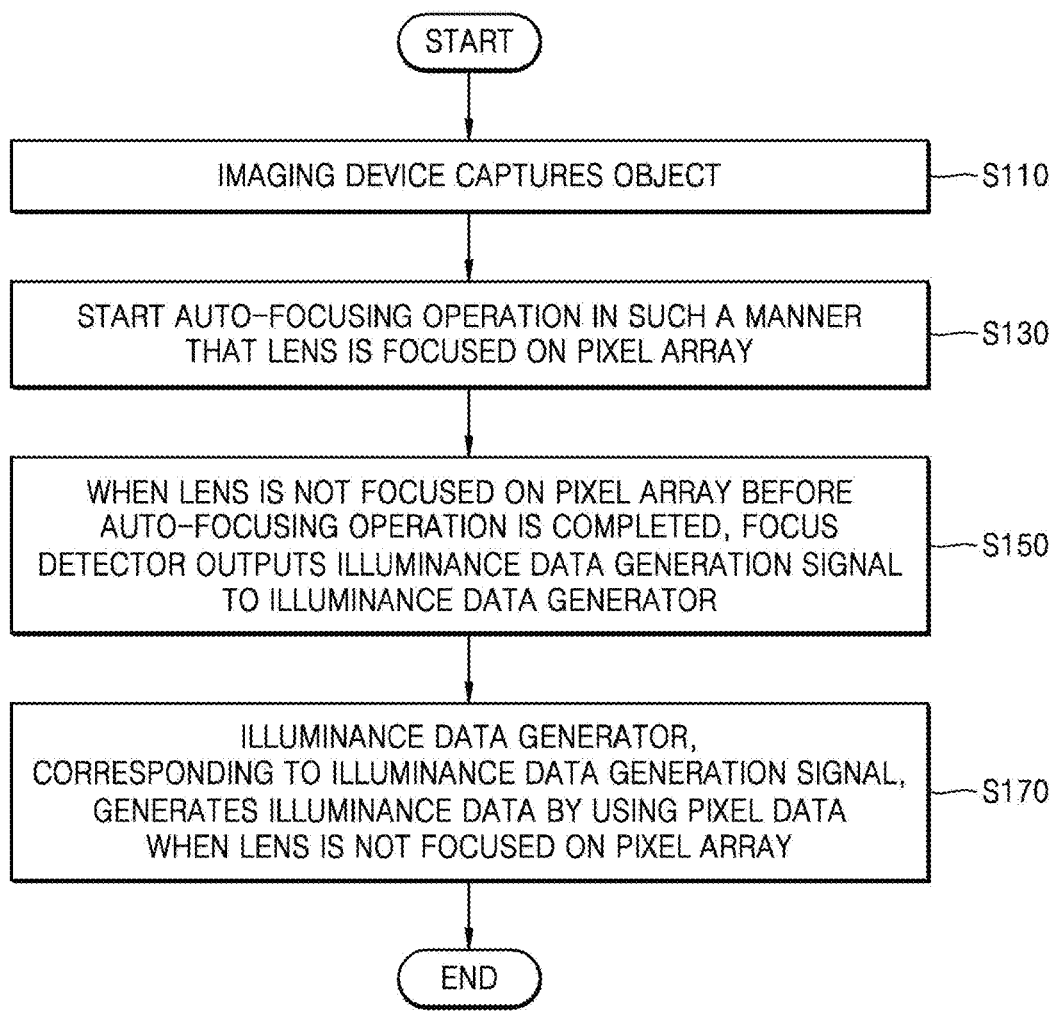
FIG. 12 is a flowchart illustrating an operating method of an imaging device according to an example embodiment of the inventive concepts.

FIG. 12 is a flowchart illustrating an operating method of an imaging device according to an example embodiment of the inventive concepts.

Referring to FIGS. 2 and 12, in operation S110, when the imaging device ID captures an object, in operation S130, an auto-focusing operation may start in such a manner that a lens is focused on the pixel array 110. In operation S150, the focus detector 40 may sense a time when the lens is not focused on the pixel array 110 before the auto-focusing operation is completed, and may output an illuminance data generation signal ILGS to the illuminance data generator 20. In operation S170, the illuminance data generator 20, corresponding to the illuminance data generation signal ILGS, may generate illuminance data ILD by using pixel data when the lens is not focused on the pixel array 110.

Figure 13:
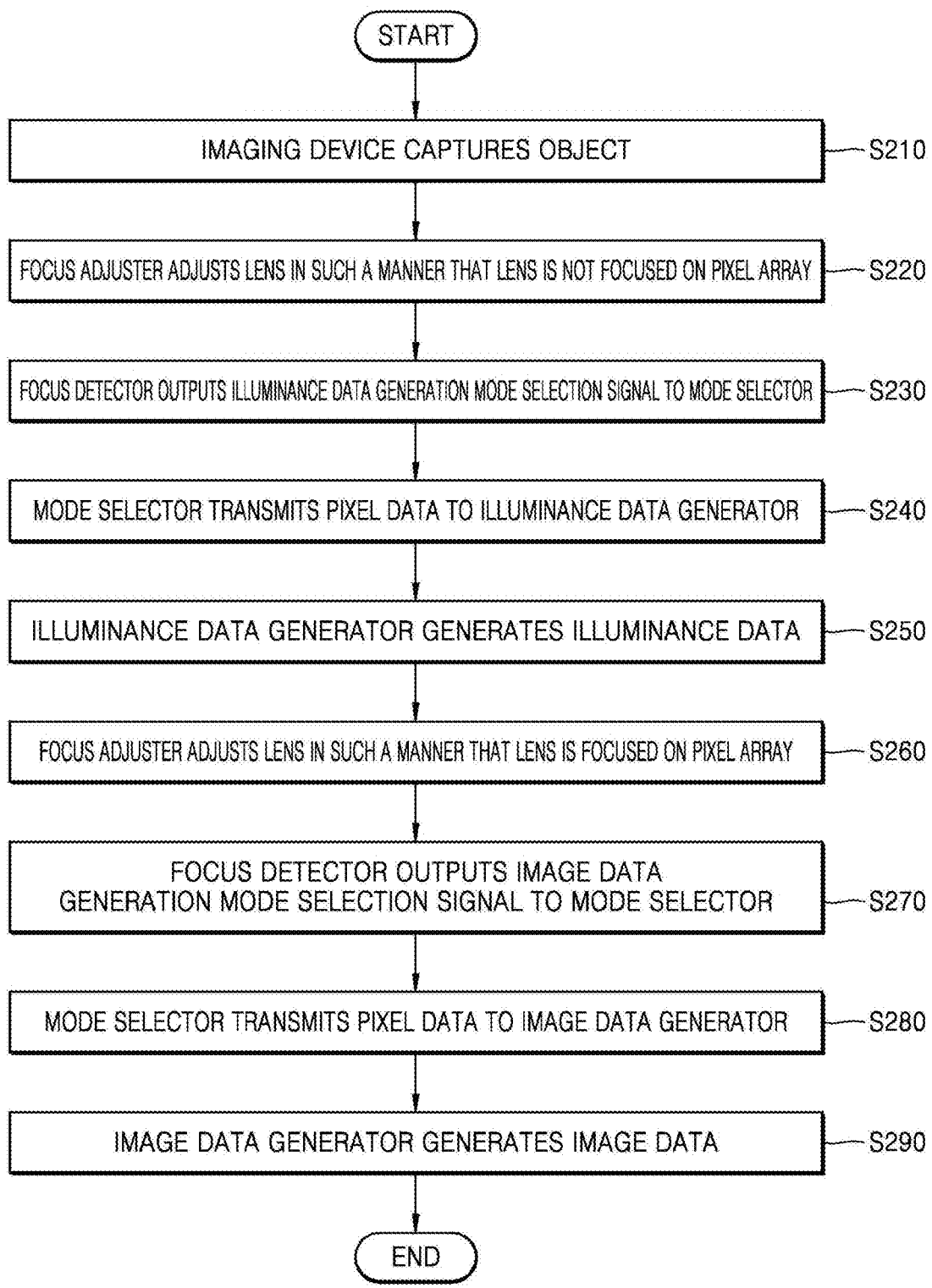
FIG. 13 is a flowchart illustrating an operating method of an imaging device according to an example embodiment of the inventive concepts.

FIG. 13 is a flowchart illustrating an operating method of an imaging device according to an example embodiment of the inventive concepts.

Referring to FIGS. 3, 4, and 13, in operation S210, when the imaging device ID captures an object, in operation S220, the focus adjuster 50 may adjust the lens 2 in such a manner that the lens 2 is not focused on a pixel array. In operation S230, the focus detector 40 may output an illuminance data generation mode selection signal to the mode selector 60 as a mode selection signal MSS, and in operation S240, the mode selector 60 may transmit pixel data PD to the illuminance data generator 20. In operation S250, the illuminance data generator 20 may generate illuminance data ILD by using the pixel data PD transmitted to the illuminance data generator 20. Next, in operation S260, the focus adjuster 50 may adjust the lens 2 in such a manner that the lens 2 is focused on the pixel array, and in operation S270, the focus detector 40 may output an image data generation mode selection signal to the mode selector 60 as a mode selection signal MSS. In operation S280, the mode selector 60 may transmit pixel data PD to the image data generator 30, and in operation S290, the image data generator 30 may generate image data IMD by using the received pixel data PD.

Figure 14:
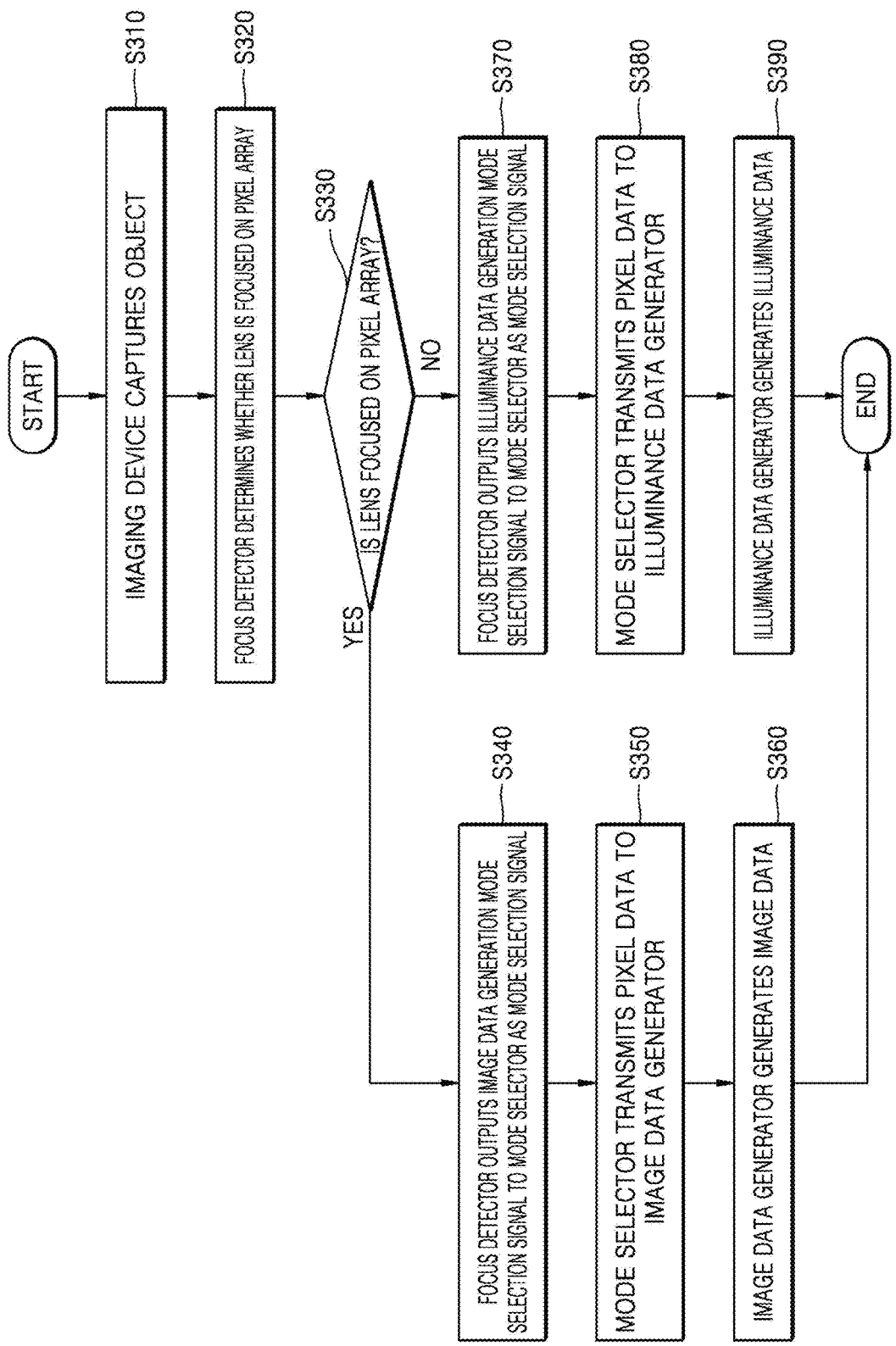
FIG. 14 is a flowchart illustrating an operating method of an imaging device according to an example embodiment of the inventive concepts.

FIG. 14 is a flowchart illustrating an operating method of an imaging device according to an example embodiment of the inventive concepts.

Referring to FIGS. 4 and 14, in operation S310, when the imaging device ID captures an object, in operation S320, the focus detector 40 may determine whether the condensed or concentrated light signal CLS is focused on a pixel array. In operation S330, when the lens 2 is focused on the pixel array, in operation S340, the focus detector 40 may output an image data generation mode selection signal to the mode selector 60 as a mode selection signal MSS. In operation S350, the mode selector 60 may transmit pixel data PD to the image data generator 30, and in operation S360, the image data generator 30 may generate image data IMD by using the received pixel data PD.

When the lens 2 is not focused on the pixel array in operation S330, in operation S370, the focus detector 40 may output an illuminance data generation mode selection signal to the mode selector 60 as a mode selection signal MSS. In operation S380, the mode selector 60 may transmit pixel data PD to the illuminance data generator 20, and in operation S390, the illuminance data generator 20 may generate illuminance data ILD by using the received pixel data PD.

According to an example embodiment of the inventive concepts, after the illuminance data generator 20 generates the illuminance data ILD, the mode selector 60 may be converted to an image data generation mode. Therefore, the mode selector 60 may transmit pixel data PD to the image data generator 30. Furthermore, according to another example embodiment of the inventive concepts, after the image data generator 30 generates the image data IMD, the mode selector 60 may be converted to an illuminance data generation mode and may transmit pixel data PD to the illuminance data generator 20.

Figure 15:
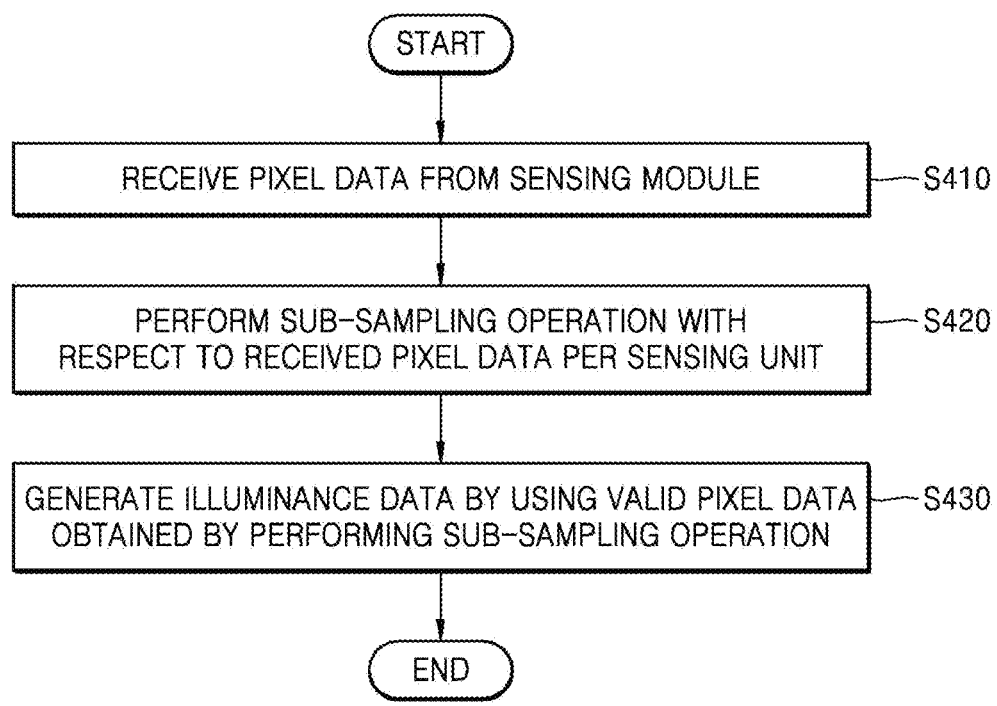
FIG. 15 is a flowchart illustrating an illuminance data generation process of an illuminance data generator according to an example embodiment of the inventive concepts.

FIG. 15 is a flowchart illustrating an illuminance data generation process of the illuminance data generator 20 according to an example embodiment of the inventive concepts.

Referring to FIGS. 1 and 15, in operation S410, the illuminance data generator 20 may receive pixel data PD from the sensing module 10. In operation S420, the illuminance data generator 20 may perform a sub-sampling operation with respect to the received pixel data PD per sensing unit SU. The illuminance data generator 20 may perform a cropping operation and a sub-sampling operation. In operation S430, the illuminance data generator 20 may generate illuminance data ILD by using valid pixel data obtained by performing the sub-sampling operation.

Figure 16A:
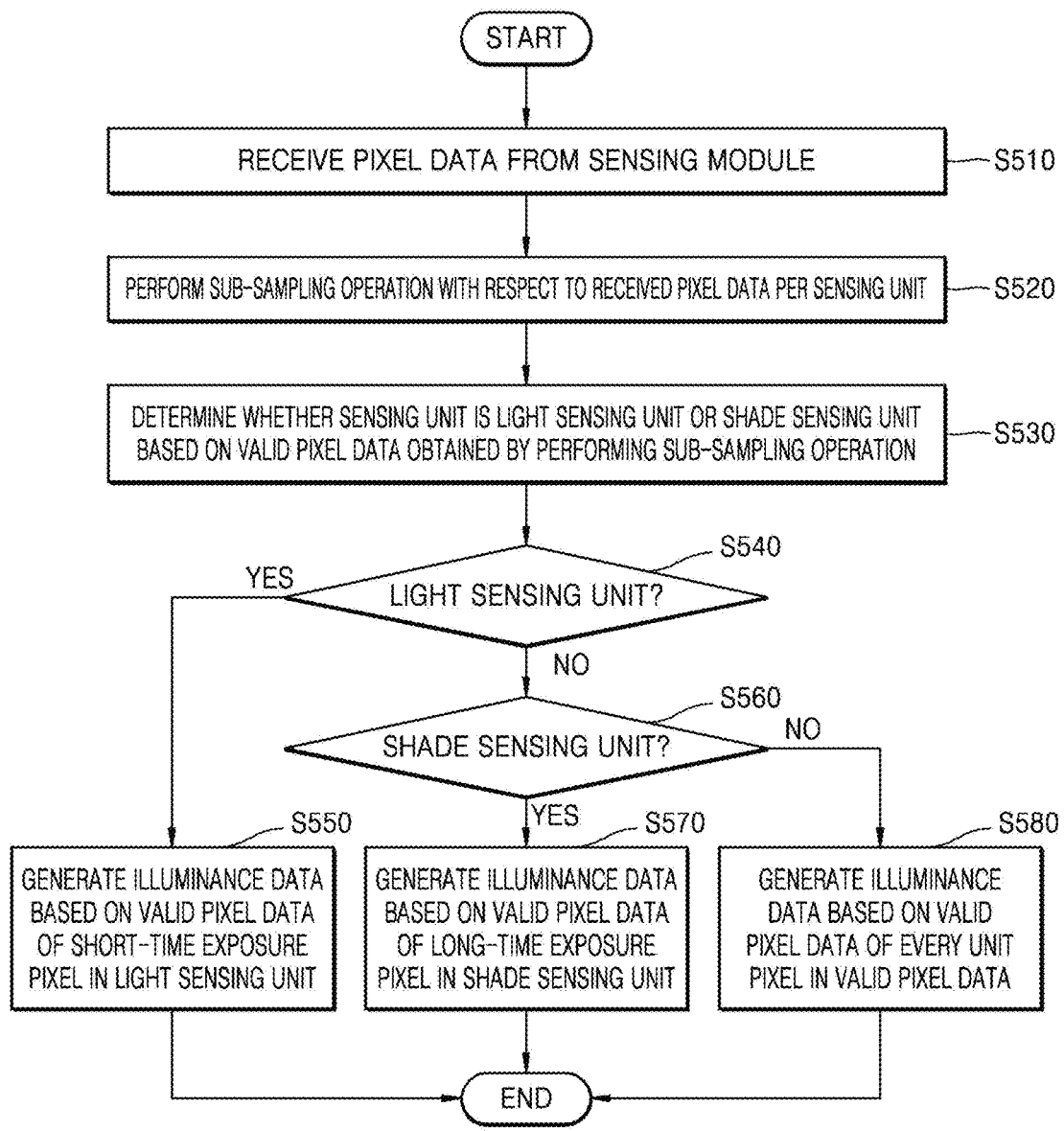
FIG. 16A is a flowchart illustrating an illuminance data generation process of an illuminance data generator according to an example embodiment of the inventive concepts.

FIG. 16A is a flowchart illustrating an illuminance data generation process of the illuminance data generator 20 according to an example embodiment of the inventive concepts.

Referring to FIGS. 1, 11, and 16A, in operation S510, when the illuminance data generator 20 receives pixel data PD from the sensing module 10, in operation S520, the illuminance data generator 20 may perform a sub-sampling operation with respect to the received pixel data PD per sensing unit SU. In operation S530, the illuminance data generator 20 may determine whether the sensing unit SU is a light sensing unit LSU or a shade sensing unit SSU based on valid pixel data obtained by performing the sub-sampling operation. As described above in FIG. 11, the illuminance data generator 20 may determine that the sensing unit SU is a light sensing unit LSU when illuminance in illuminance information included in the valid pixel data is equal to or greater than the first reference illuminance, and may determine that the sensing unit SU is a shade sensing unit SSU when illuminance in illuminance information included in the valid pixel data is equal to or less than the second reference illuminance.

In operation S540, when the illuminance data generator 20 determines that the sensing unit SU is a light sensing unit LSU, in operation S550, the illuminance data generator 20 may generate illuminance data ILD based on valid pixel data of a short-time exposure pixel in the light sensing unit LSU. In operation S560, when the illuminance data generator 20 determines that the sensing unit SU is a shade sensing unit SSU, in operation S570, the illuminance data generator 20 may generate illuminance data ILD based on valid pixel data of a long-time exposure pixel in the shade sensing unit SSU. When the illuminance data generator 20 determines that the sensing unit SU is neither the light sensing unit LSU nor the shade sensing unit SSU in operation S560, in operation S580, the illuminance data generator 20 may generate illuminance data ILD based on valid pixel data of every unit pixel PX included in the valid pixel data.

Figure 16B:
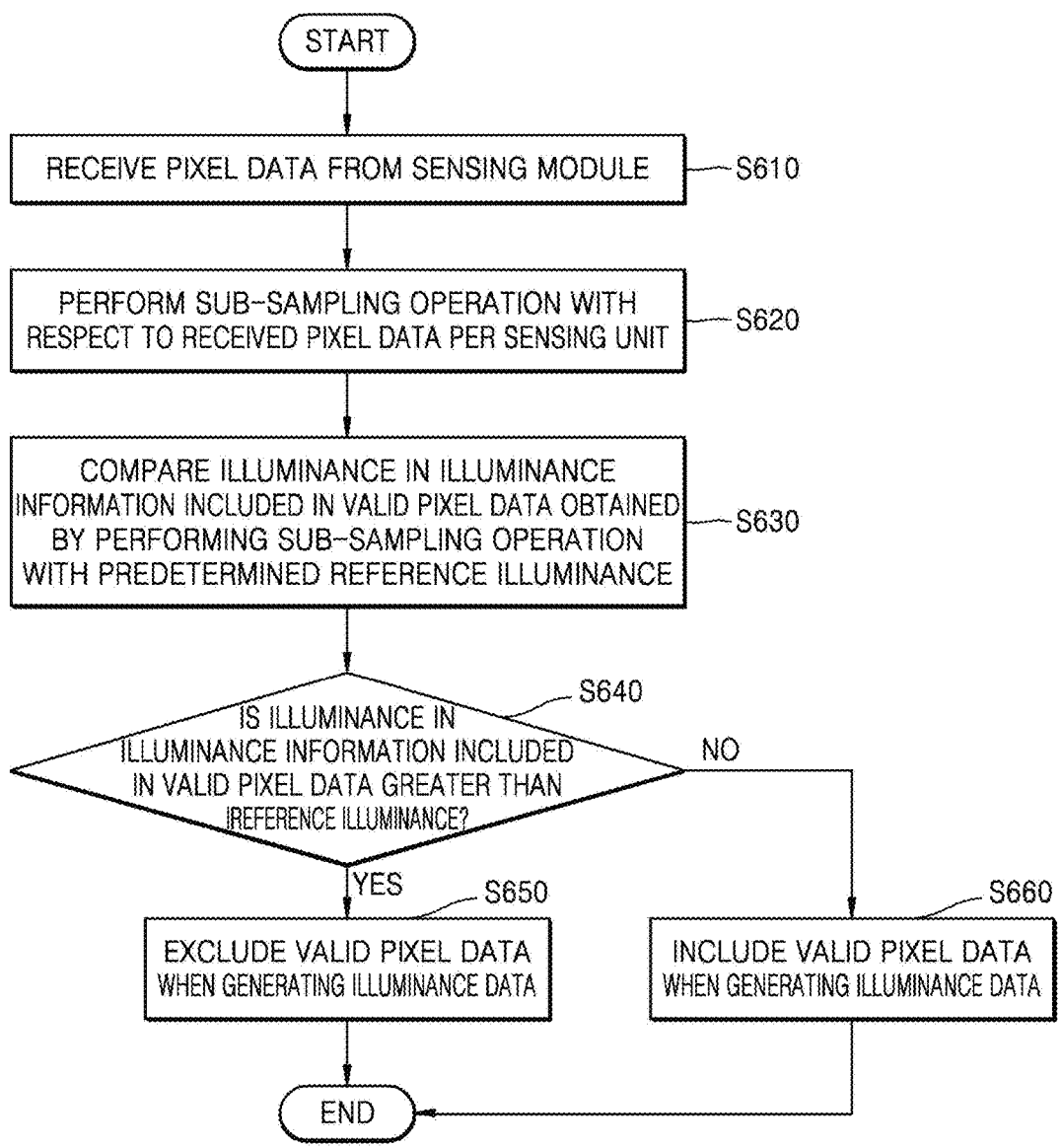
FIG. 16B is a flowchart illustrating an illuminance data generation process of an illuminance data generator according to an example embodiment of the inventive concepts.

FIG. 16B is a flowchart illustrating an illuminance data generation process of the illuminance data generator 20 according to an example embodiment of the inventive concepts.

Referring to FIGS. 1, 7, and 16B, in operation S610, when the illuminance data generator 20 receives pixel data PD from the sensing module 10, in operation S620, the illuminance data generator 20 may perform a sub-sampling operation with respect to the received pixel data PD per sensing unit SU. In operation S630, the illuminance data generator 20 may compare illuminance in illuminance information included in valid pixel data obtained by performing the sub-sampling operation with reference illuminance.

In operation S640, when illuminance in the illuminance information included in the valid pixel data is greater than the reference illuminance, in operation S650, the illuminance data generator 20 may exclude the valid pixel data when generating illuminance data ILD. When the illuminance in the illuminance information included in the valid pixel data is equal to or less than the reference illuminance in operation S640, in operation S660, the illuminance data generator 20 may include the valid pixel data when generating illuminance data ILD.

FIG. 16B shows an example of the illuminance data generator 20 determining whether including the valid pixel data according to illuminance information included in valid pixel data when generating illuminance data ILD, but the inventive concepts are not limited thereto. The illuminance data generator 20 may also select valid pixel data according to a reference when generating illuminance data ILD.

Figure 17:
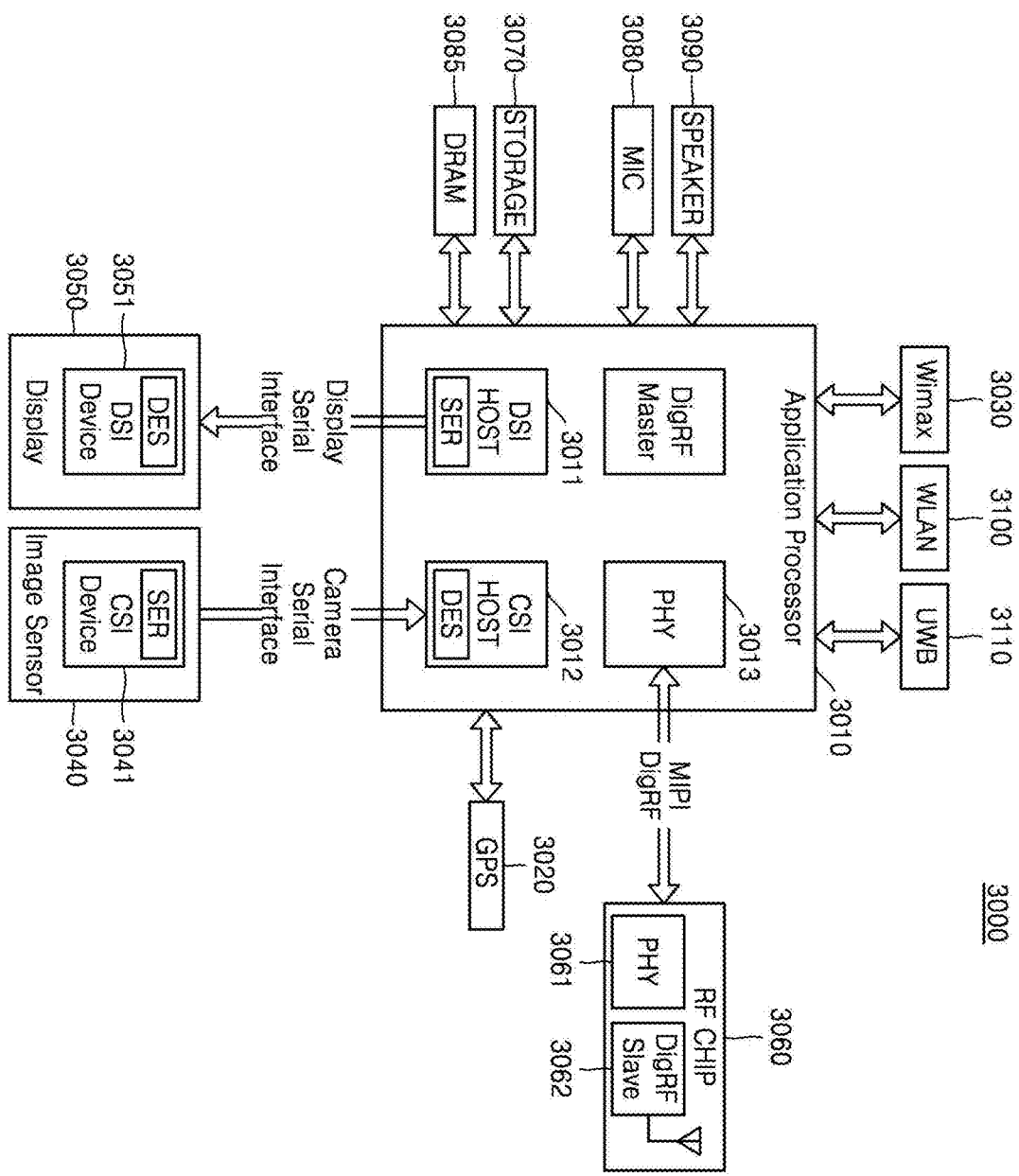
FIG. 17 is a view of an electronic system including an image sensor and an interface according to an example embodiment of the inventive concepts.

FIG. 17 is a view of an electronic system including an image sensor and an interface according to an example embodiment of the inventive concepts.

Referring to FIG. 17, an electronic system 3000 may be realized by a data processor capable of using or supporting an interface by a mobile industry processor interface (MIPI), for example, a mobile phone, a personal digital assistant (PDA), a portable multimedia player (PMP), or a smart phone. The electronic system 3000 may include an application processor 3010, an image sensor 3040, and a display 3050. The image sensor 3040 may include the image sensor 1 described in FIGS. 1 through 18.

A camera serial interface (CSI) host 3012, which is realized in the application processor 3010, may perform serial communication with a CSI device 3041 of the image sensor 3040 through a CSI. For example, an optical deserializer may be realized in the CSI host 3012, and an optical serializer may be realized in the CSI device 3041. A display serial interface (DSI) host 3011, which is realized in the application processor 3010, may perform serial communication with a DSI device 3051 of the display 3050 through a DSI. For example, an optical serializer may be realized in the DSI host 3011, and an optical deserializer may be realized in the DSI device 3051.

The electronic system 3000 may further include a radio frequency (RF) chip 3060 capable of communicating with the application processor 3010. A physical layer (PHY) 3013 of the electronic system 3000 may transmit and receive data to/from a PHY 3061 of the RF chip 3060 according to MIPI DigRF. The electronic system 3000 may further include a global positioning system (GPS) 3020, a storage unit 3070, a microphone 3080, a dynamic random access memory (DRAM) 3085, and a speaker 3090, and the electronic system 3000 may communicate with the application processor 3010 by using Wimax 3030, WLAN 3100, and UWB 3110.

While the inventive concepts have been particularly shown and described with reference to example embodiments thereof, it will be understood that various changes in form and details may be made therein without departing from the spirit and scope of the following claims.

What is claimed is:

1. An image sensor configured to generate illuminance data by receiving a light signal, the light signal including image information of an object and ambient light information, the image sensor comprising:
a sensing module including a pixel array, the sensing module configured to sense the light signal irradiated to the pixel array, and configured to generate pixel data corresponding to the sensed light signal; and
an illuminance data generator configured to generate the illuminance data corresponding to ambient light based on the pixel data, wherein
the illuminance data generator is configured to generate the illuminance data based on the pixel data when the light signal is not focused on the pixel array,
wherein the pixel array includes a plurality of sensing units, the plurality of sensing units including at least two of a plurality of unit pixels, and
the illuminance data generator is configured to select a plurality of valid sensing units from among the plurality of sensing units by performing a sub-sampling operation with respect to the pixel array, and the illuminance data generator is configured to generate the illuminance data based on a valid pixel data corresponding to the selected plurality of valid sensing units, and
wherein the pixel array includes a light sensing unit exposed to light brighter than a reference illuminance and a shade sensing unit exposed to light dimmer than the reference illuminance, and
the illuminance data generator is configured to generate the illuminance data based on the valid pixel data, the valid pixel data including a valid pixel data of a short-time exposure pixel in the light sensing unit with respect to the light sensing unit and a valid pixel data of a long-time exposure pixel in the shade sensing unit with respect to the shade sensing unit.

2. The image sensor of claim 1, further comprising:
a focus detector configured to sense whether the light signal is focused on the pixel array and to output an illuminance data generation signal to the illuminance data generator when the light signal is not focused on the pixel array.

3. The image sensor of claim 1, further comprising:
a focus adjuster configured to adjust a focus of the light signal.

4. The image sensor of claim 1, further comprising:
an image data generator configured to generate image data corresponding to the object based on the pixel data.

5. The image sensor of claim 4, further comprising:
a mode selector configured to selectively activate at least one of the image data generator or the illuminance data generator.

6. The image sensor of claim 1, wherein
at least one of the plurality of valid sensing units includes at least one long-time exposure pixel and at least one short-time exposure pixel.

7. The image sensor of claim 1, wherein
the pixel array includes at least one first sensing unit and at least one second sensing unit, and
the first sensing unit includes one long-time exposure pixel and three short-time exposure pixels, and the second sensing unit includes one short-time exposure pixel and three long-time exposure pixels.

8. The image sensor of claim 1, wherein
the illuminance data generator does not use at least one of the valid pixel data.

9. The image sensor of claim 8, wherein
when illuminance in illuminance information included in the valid pixel data is equal to or greater than a reference illuminance, the illuminance data generator does not use the valid pixel data when generating the illuminance data.

10. An imaging device comprising:
a lens configured to concentrate a light signal, the light signal including image information of an object and ambient light information;
a focus adjusting module configured to adjust a focus of the light signal; and
an image sensor including a sensing module, the sensing module including a pixel array, the pixel array including a plurality of sensing units, the sensing module configured to sense the light signal irradiated to the pixel array and to generate a pixel data corresponding to the sensed light signal, the image sensor further including an illuminance data generator configured to generate illuminance data corresponding to ambient light based on the pixel data, wherein
the illuminance data generator is configured to select a plurality of valid sensing units from among the plurality of sensing units by performing a sub-sampling operation with respect to the pixel array, and the illuminance data generator is configured to generate the illuminance data based on valid pixel data corresponding to the plurality of valid sensing units when the light signal is not focused on the pixel array, and at least one of the plurality of valid sensing units includes a light sensing unit exposed to bright light and a shade sensing unit exposed to dim light, at least one of the light sensing unit and the shade sensing unit comprises at least one long-time exposure pixel and at least one short-time exposure pixel, and the illuminance data generator is configured to generate the illuminance data based on valid pixel data, the valid pixel data including a valid pixel data of a short-time exposure pixel in the light sensing unit with respect to the light sensing unit and a valid pixel data of a long-time exposure pixel in the shade sensing unit with respect to the shade sensing unit.

11. The imaging device of claim 10, wherein the focus adjusting module is configured to perform an auto-focusing operation automatically adjusting the light signal focused on the pixel array, the image sensor further includes a focus detector configured to output an illuminance data generation signal to the illuminance data generator when the light signal is not focused on the pixel array before the auto-focusing operation is completed, and the illuminance data generator is configured to generate the illuminance data based on valid pixel data when the light signal is not focused on the sensing module in response to the illuminance data generation signal.

12. The imaging device of claim 10, wherein the illuminance data generator does not use at least some of the valid pixel data to generate the illuminance data according to a reference illuminance.

13. An electronic system comprising:

an application processor; and an image sensor connected to the application processor, the image sensor including a pixel array, and an image sensor processor configured to operate in a first mode to sense a light signal irradiated to the pixel array, to generate pixel data corresponding to the sensed light signal, and to generate illuminance data corresponding to ambient light based on the pixel data when the light signal is not focused on the pixel array, wherein the pixel array includes a light sensing unit exposed to light brighter than a reference illuminance and a shade sensing unit exposed to light dimmer than the reference illuminance, and the image sensor processor is configured to generate the illuminance data based on a valid pixel data, the valid pixel data including a valid pixel data of a short-time exposure pixel in the light sensing unit with respect to the light sensing unit and a valid pixel data of a long-time exposure pixel in the shade sensing unit with respect to the shade sensing unit.

14. The electronic system of claim 13, further comprising: a display connected to the application processor.

15. The electronic system of claim 13, wherein the image sensor processor is further configured to, sense whether the light signal is focused on the pixel array, and operate in a second mode to generate image data corresponding to an object based on the pixel data.

16. The electronic system of claim 15, wherein the image sensor processor is configured to operate in the first mode when the image sensor processor senses that the light signal is not focused on the pixel array.

17. The electronic system of claim 15, wherein the image sensor processor is configured to adjust a focus of the light signal in such a manner that a lens is not focused on the pixel array before the image sensor processor generates the illuminance data, and wherein the image sensor processor is configured to adjust the focus of the light signal in such a manner that the lens is focused on the pixel array before the image sensor processor generates the image data.

\* \* \* \* \*